United States Patent
Brandwine (10) Patent No.: US 9,754,253 B1
(45) Date of Patent: Sep. 5, 2017

(54) CONDITIONED USE OF CERTIFICATES

(75) Inventor: Eric J. Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 1345 days.

(21) Appl. No.: 13/305,547

(22) Filed: Nov. 28, 2011

(51) Int. Cl.
*G06Q 20/00* (2012.01)
*G06Q 20/38* (2012.01)

(52) U.S. Cl.
CPC .................. *G06Q 20/382* (2013.01)

(58) Field of Classification Search
CPC .... G06Q 40/00; G06Q 20/382; G06Q 20/367; G06Q 20/3674
USPC .......................................................... 705/35
See application file for complete search history.

(56) References Cited

U.S. PATENT DOCUMENTS

| | | | | |
|---|---|---|---|---|
| 5,633,929 | A * | 5/1997 | Kaliski, Jr. | 380/286 |
| 5,872,849 | A * | 2/1999 | Sudia | 713/175 |
| 6,853,987 | B1 * | 2/2005 | Cook | G06Q 20/027 705/64 |
| 6,968,060 | B1 * | 11/2005 | Pinkas | 380/277 |
| 8,559,639 | B2 * | 10/2013 | Hird | 380/277 |
| 2002/0029337 | A1 * | 3/2002 | Sudia et al. | 713/176 |
| 2002/0053022 | A1 * | 5/2002 | Groves | G06Q 20/02 713/155 |
| 2005/0177521 | A1 * | 8/2005 | Crosson Smith | G06Q 20/10 705/67 |
| 2006/0111375 | A1 * | 5/2006 | Shimizu | C07D 401/14 514/266.3 |

* cited by examiner

*Primary Examiner* — Lalita M Hamilton
(74) *Attorney, Agent, or Firm* — Lee & Hayes, PLLC (57) ABSTRACT

Identity certificates such as SSL certificates can be issued in such a way that their use can be disabled upon short notice. In one embodiment, private signing information associated with a certificate is used by an infrastructure service on behalf of an entity, without making the private signing information accessible to the entity. In another embodiment, short-term certificates are dynamically issued to an application based on a previous certificate authorization.

27 Claims, 7 Drawing Sheets

CONDITIONED USE OF CERTIFICATES

BACKGROUND

Network server authentication can be performed using certificates that can be verified as having originated from a trusted source. SSL (secure sockets layer) is an example of a protocol that uses certificates such as this. The certificates themselves may be created in accordance with the X.509 standard, and may be referred to as X.509 certificates.

Certificates are issued by CAs (certificate authorities) after performing identity verification and other verifications with respect to requesting entities and information that the entities are seeking to assert. A certificate contains various types of information, and serves in part to bind an identified entity or website with an asymmetric key pair. The identity certificate is cryptographically signed by the issuing CA, and can be traced through a hierarchy of CAs to a CA that is known and trusted.

Certificates such as this are widely used on the Internet to establish the identity and/or authenticity of websites. When a consumer such as a web browser requests data from an entity's server, the server also provides the certificate of the website and one or more signatures. The signatures are generated using the private portion of the entity's asymmetric key pair and the certificate specifies the public portion of the key pair. The consumer can trace the validity of the certificate to a trusted CA, and can then verify the signatures using the public key specified by the certificate. The signatures may be part of the certificate itself, of a data object to be returned by the server, and/or of a combination of data.

A certificate is typically issued by a CA in return for a fee, after the CA has investigated and authorized the requesting entity. An issued CA may be valid for months or years, and the certificate itself specifies its expiration date. Upon expiration of a certificate, the owning entity must again apply to the CA and go through an identity investigation/verification process.

Once issued, a certificate can be used without further authorization by or interaction with the issuing CA. Thus, the consequences of issuing a bad certificate are significant. Although there are revocation mechanisms that can be used to invalidate issued certificates, these mechanisms are often not reliable.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes systems, devices, and techniques that can be used within existing authentication infrastructures to issue certificates that can be effectively withdrawn or disabled with very little notice. This capability can be used to disable "bad" certificates, and may also be used to implement different pricing structures for certificates. In particular, the described techniques make it possible to charge for certificates based on actual usage, and/or to authorize certificate usage for indeterminate time periods. As an example, continued use of a certificate may be contingent upon continued incremental payment by the entity to whom the certificate has been issued.

Figure 1:
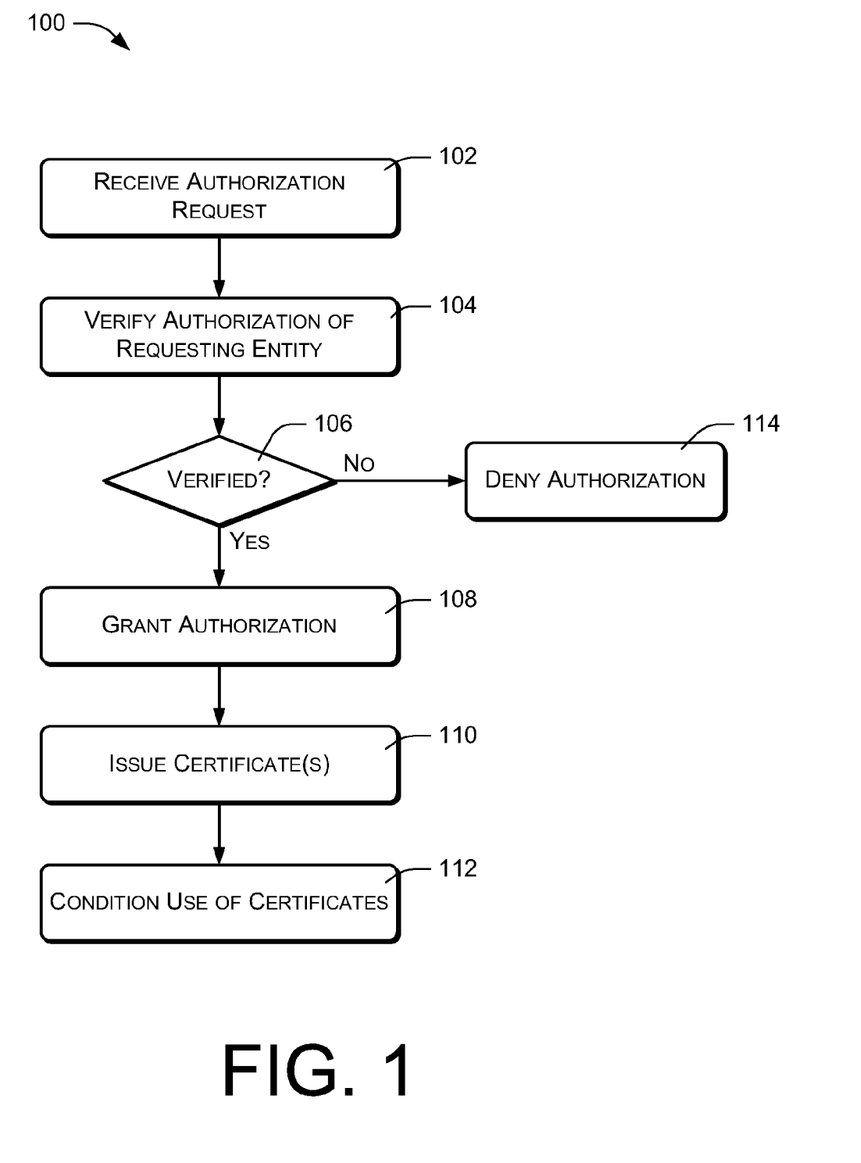
FIG. 1 is a flow diagram illustrating an example method of issuing and using identity certificates.

FIG. 1 shows a generalized method 100 of issuing and using such certificates. The certificates may be used in an SSL environment and may comprise X.509 certificates, although other formats, standards, and protocols may also be used. The method may be performed by a CA (certification authority), in conjunction with a CA, or by some other type of provider such as the provider of a virtual infrastructure or IaaS (infrastructure as a service).

An action 102 comprises receiving an authorization request from a requesting entity for a certificate authorization. The requesting entity may be a developer or other entity responsible for a website or other application that will use certificates. In some embodiments, the requesting entity may provide authorization information as part of the authorization request, such as the public portion of an asymmetric key pair that includes both a public key and a corresponding private key. In other embodiments, the key pair may be generated by a CA or other provider. The authorization request may also include information about the requesting entity such as names, identifications, and so forth, as well as information about a website, application, or service with which the requested certificate is to be associated.

An action 104 comprises verifying the authorization of the requesting entity. This may involve some type of investigation by the provider and/or may involve submission of some type of proof of the requesting entity's identity, similar to verification processes that are conventionally implemented prior to granting certificates. The verification may also involve confirming that the requesting entity has rights with respect to specified domains and that other information to be asserted in the requested certificate is accurate.

If the requesting entity is verified as being authorized, and the information asserted by the requesting entity is determined to be accurate, as indicated by the "Yes" branch of decision block 106, an action 108 is performed, comprising granting authorization for the requesting entity to obtain one or more certificates. The certificate authorization may be for a specified time period or authorization period, such as a number of weeks, months, or years. For example, the authorization may be for a relatively long period, such as a number of years.

An action 110 comprises issuing one or more certificates to the requesting entity, based on the certificate authorization granted at 108. The certificates bind the requesting entity to a public cryptographic key that can be used to verify signatures purported to have been generated by the requesting entity. In addition, the certificates can be traced to a trusted CA, and can be verified as being unaltered since issued by the CA. In some cases, the certificates attest to additional information that has been provided by the requesting entity, such as network domains to which it has rights.

An action 112 comprises conditioning the continuing use of any granted certificates upon some activity or condition relating to the requesting entity, such as continued payment by the requesting entity or continued authorization of the requesting entity. This may be accomplished in different ways, as will be described below. Generally, certificate use can be allowed and disallowed over arbitrarily small periods of time, such as second, minutes, or hours.

In some embodiments, short-term certificates are issued in the action 110, based on the longer-term certificate authorization granted in the action 108. Applications making use of the certificates may request new certificates upon every use, or whenever the currently held certificate expires. The certificate provider or CA may respond by immediately providing the new certificate based on the previously established authorization of the requesting entity.

In other embodiments, a granted certificate may be held by a provider and used on the requesting entity's behalf, without revealing all details of the certificate to the requesting entity. For example, the private key associated with the certificate may be inaccessible to or hidden from the requesting entity but used on behalf of the requesting entity to generate signatures. This allows the provider to refuse to generate signatures at any time, effectively allowing the provider to withdraw access to a granted certificate regardless of its literal expiration date.

Note that if the provider is unable at 106 to authorize the requesting entity, indicated by the "no" branch of action 106, an action 114 is performed of denying certificate authorization to the requesting entity. In this case, certificates will not be issued to the requesting entity.

Note also that the action 112, in which continued use of certificates is conditioned, may be based on factors other than continued payment of certificate usage fees. For example, it may be discovered that a certificate authorization was granted in error, and that the requesting entity is not in fact authorized to receive a particular certificate. In this case, the action 112 may comprise conditioning certificate usage on continued entity authorization—when authorization is withdrawn, certificate usage is disabled.

The ability to issue short-term certificates based on a longer-term authorization, and to withdraw or disable certificates after they have been issued or authorized, allows certificate pricing to be configured in a number of different ways. As an example, a provider may charge for certificate usage based on very short time periods, such as seconds, minutes, or hours. As another example, a provider may charge for certificate usage based on the volume of such usage, such as by the number of signatures or responses generated in conjunction with the certificate or the number of secure connections terminated using the certificate. Continued use of generated certificates may be conditioned upon repeated payment or payment authorization by the requesting entity for such certificate usage charges.

Figure 2:
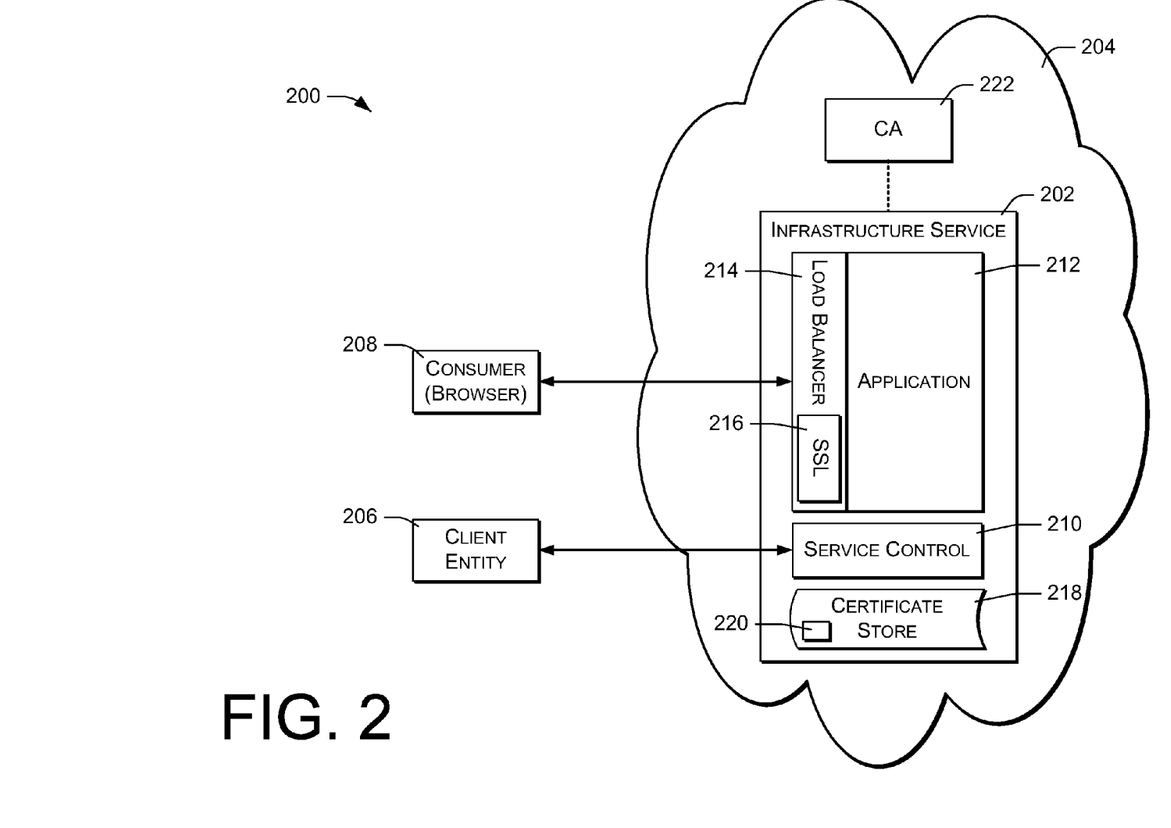
FIG. 2 is a block diagram illustrating a first example environment in which certificates may be issued to and used by applications.
Figure 3:
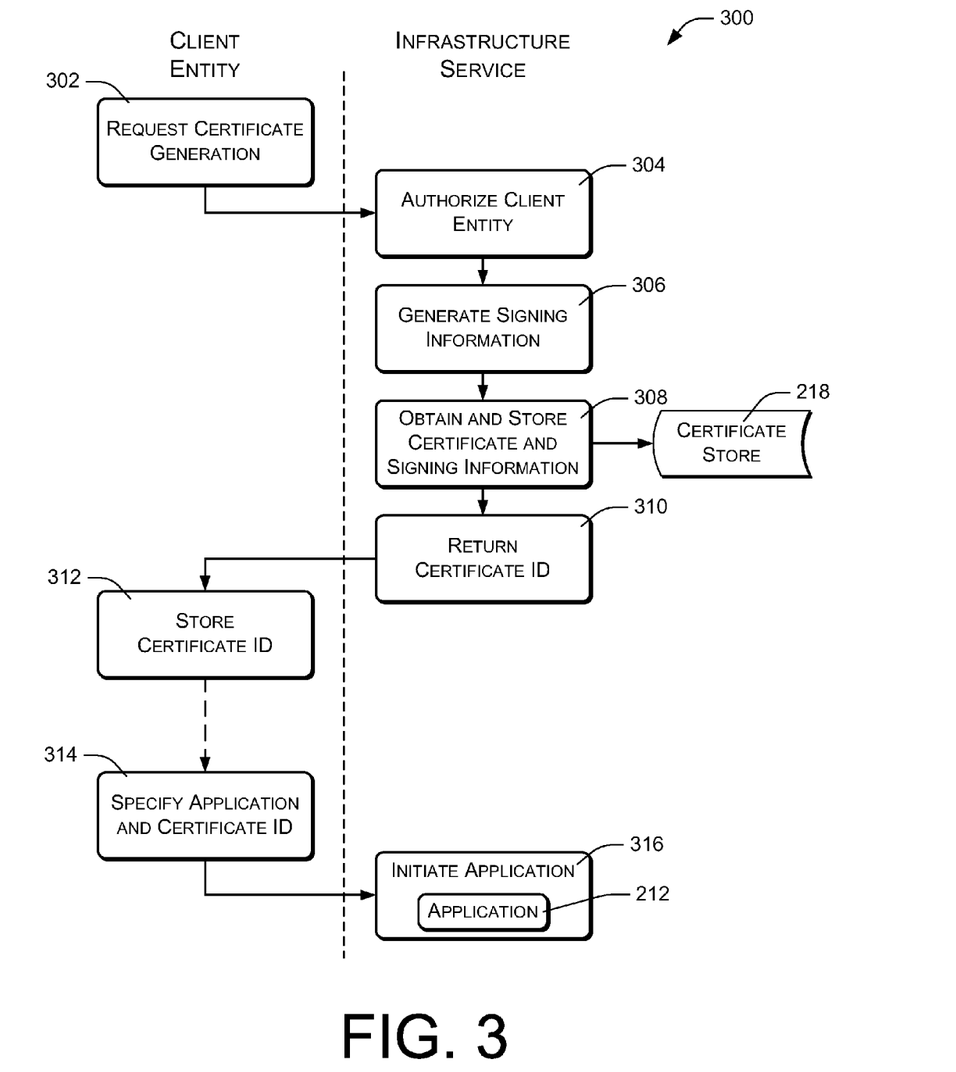
FIGS. 3 and 4 are flow diagrams illustrating an example method that may be used in the environment of FIG. 2 to issue and use identity certificates.
Figure 4:
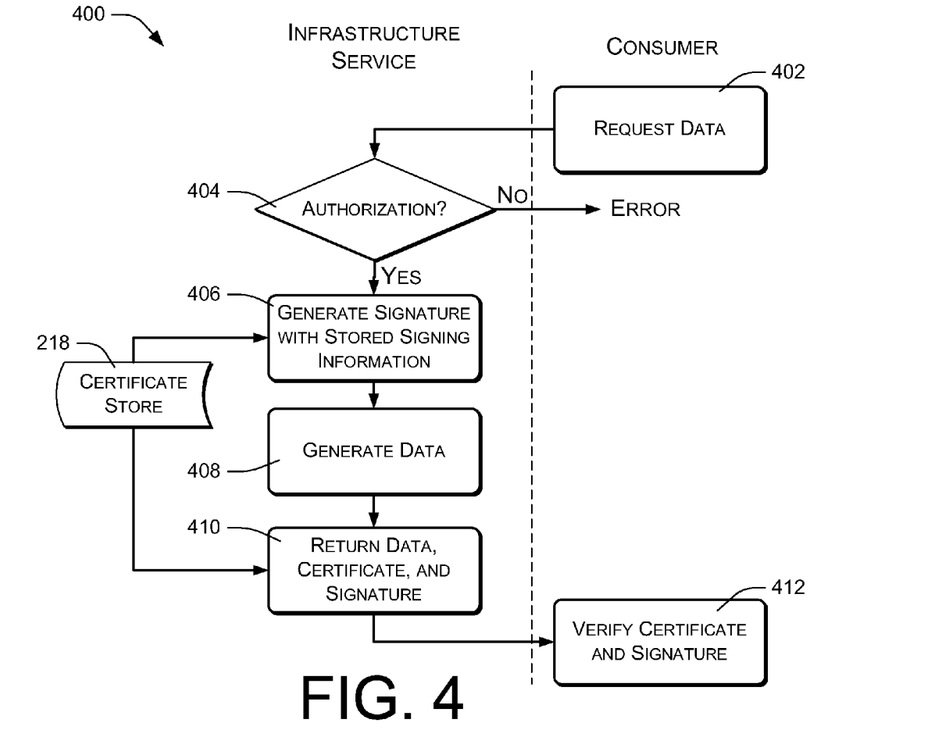

FIG. 2 shows an example environment 200 in which the method of FIG. 1 may be implemented. FIGS. 3 and 4 illustrate actions that may be performed in the environment 200 to implement the described techniques.

The environment 200 includes a software infrastructure service 202, which may comprise a virtual computing service or some other type of service that implements applications on behalf of developers or other entities. The infrastructure service 202 may be a network-based service, providing virtual infrastructure and/or other computing services that are accessible by both developers and application consumers over a network 204, which may comprise a private network, a public network such as the Internet, or a combination of private and public networks.

For purposes of discussion, a single developer or client entity 206 and a single consumer 208 are shown in FIG. 2. The client entity 206 may also be referred to as an entity 206 or requesting entity 206. The consumer 208 may be implemented by an Internet browser or by some other type of software that requests and/or receives data from a source such as a server.

The client entity 206 may interact with the infrastructure service 202 through a service control element or module 210, which may also be referred to as a control plane. The infrastructure service 202 may perform various authentication procedures with respect to the client entity 206 prior to allowing the entity 206 to configure services within the infrastructure service 202. For example, the entity 206 may be asked to authenticate using a password or some other security token.

Through interaction with the service control element 210, the client entity 206 can specify an application 212 to be executed by the infrastructure service 202. The application 212 may be defined by code, executable modules, configuration settings, and so forth that are provided or specified by the entity 206. In addition, the infrastructure service 202 may define executable modules or functionality that can be instantiated and used by the entity 206 in conjunction with the application 212. In the example of FIG. 2, the entity 206 has specified a load balancer 214 to be used in conjunction with the application 212. The load balancer 214 may comprise a software component provided by the infrastructure service 202 to receive network requests from consumers 208 and to perform certain processing with respect to the received requests. In this example, the load balancer includes an SSL module 216 that handles SSL terminations for the application 212. Thus, the load balancer 214 receives and responds to SSL connection requests, using the SSL module 216. After establishing the SSL connection, the load balancer 214 facilitates communications between the consumer 208 and the application 212. Specifically, the load balancer 214 passes consumer requests to instances of the application 212, and relays responses back to the consumer 208.

In conjunction with the load balancer 214 and the SSL module 216 maintained by the infrastructure service 202, the infrastructure service 202 may maintain and provide a certificate store 218. Certificates, such as a certificate 220, may be stored in the certificate store 218 by or on behalf of the client entity 206, along with signing information such as public and/or private cryptographic keys associated with the certificates. The SSL component may have access to the certificates of the certificate store 218, and may use the certificates when handling SSL connection requests.

In particular, each certificate 220 of the certificate store 218 may be associated with an identifier, and the entity 206 may specify one of the certificates 220 by its identifier to be used by the SSL module 216 when handling SSL requests. When the SSL module 216 receives an SSL request, it may access the identified certificate and provide it to the requesting consumer. The load balancer 214 and/or SSL module 216 may also generate any signatures that are to accompany application requests.

A CA 222 may be available to the infrastructure service for use in generating certificates. Note that in some embodiments, the infrastructure service itself may function as an issuing CA 222. In other embodiments, the infrastructure service 202 may have a relationship with a separate CA 222, and the two entities may work together to provide the services described below.

FIG. 3 illustrates an example 300 of how a developer or other entity 206 may interact with the infrastructure service 202 in order to set up the application configuration shown by FIG. 3, and actions that may be performed in response by the infrastructure service 202. Actions performed by the entity 206 are shown on the left. Actions performed by the infrastructure service 202 are shown on the right.

An action 302 may comprise requesting that the infrastructure service 202 generate and/or provide a certificate 220 that is to be associated with the entity 206 and/or the application 212. As part of this request, the entity 206 may authenticate with the infrastructure service 202 and may provide any information deemed necessary by the infrastructure service 202 and/or the CA 222 to verify authorization of the entity 206 with respect to the requested certificate.

An action 304, performed by the infrastructure service 202 in conjunction with the CA 222, comprises verifying the authorization of the entity 206 and authorizing the entity 206 to receive the requested certificate. This may involve manual investigation and approval by staff members of the CA 222, or may be performed using various different types of processes.

After authorizing or verifying the requesting entity 206, an action 306 may comprise generating signing information for the requesting entity 206. In many embodiments, this may involve identifying public and private cryptographic keys for use in conjunction with the entity 206 and/or the application 212. The private key is kept hidden and inaccessible to both the requesting entity 206 and requesting consumers. The requesting entity 206 may also generate a CSR (certificate signing request), specifying information that is asserted by the requesting entity 206 and which is to be attested to by a CA. The CSR may specify various information such as Internet naming zones or domains, entity names, geographic locations, and so forth.

An action 308, performed by the infrastructure service 202, may comprise obtaining a certificate based on the generated signing information and the information specified by the CSR, and storing the certificate and signing information in the certificate store 218 for use in conjunction with the application 212. The infrastructure service 202 may itself generate and sign the certificate, or may interact with a separate CA 222 to generate the certificate. When generated and signed, the certificate associates the requesting entity 206 and/or the application 212 with the signing information generated at 306, and explicitly identifies a public portion of the generated signing information, such as the public portion of a public/private cryptographic key pair. The certificate may also specify an expiration date and may attest to other information that has been asserted by the entity in the CSR.

An action 310 comprises returning a certificate identification (ID) to the requesting entity 206. The certificate ID may be a code, sequence number, or other identifier that allows the entity 206 and the infrastructure service 202 to reference the newly granted certificate.

Note that in this embodiment, the private portion of the certificate signing information is not returned to the requesting entity 206, and is not accessible to the entity 206. Rather, the private signing information is kept or associated with the certificate in the certificate store 218, to be used on the entity's behalf in future signing operations. More specifically, the private portion of the public/private asymmetric key pair generated at 306 is not accessible to the entity 206.

Upon receiving the certificate ID, the client entity 206 performs an action 312 of storing or recording the certificate ID for future use. At a different time, the client entity 206 may perform an action 314 of specifying the application 212 to the infrastructure service 202 along with the certificate ID. The application 212 may be specified in terms of code, modules, settings, protocols, services, and so forth, and may use the SSL module 216 or similar component that is able to access the certificate store 218 on behalf of the client entity 206.

Upon receiving an instruction from the client entity 206, the infrastructure service 202 may perform an action 316 of instantiating and/or initiating the application 212, which will use the certificate specified by the entity 206 when generating responses.

FIG. 4 illustrates an example 400 of how the infrastructure service 202 and the application 212 may respond to requests by the consumer 208. Actions on the left are performed by the infrastructure service 202 and/or the application 212. Actions on the right are performed by the requesting consumer 208 or other entity, which may be implemented as a network browser or other network client.

An action 402, performed by the consumer 208, comprises requesting data from the application 212. This action may comprise, as an example, transmitting an HTTP (hypertext transfer protocol) request to the application 212, in response to a user clicking on an Internet link.

Upon receiving the data request, the infrastructure service 202 performs an action 404 of verifying the continued authorization of the client entity 206. This may comprise verifying and/or updating a certificate account corresponding to the certificate 220 that has been associated by the client entity 206 with the application 212. This may include posting additional certificate usage fees to the client entity, or verifying that the entity has authorized further charges. It may include debiting the entity's account to reflect continued usage of the certificate 220. It may further include verifying that the originally granted authorization has not been canceled or requested to be canceled, such as might happen upon discovery of a security breach or lapse, or upon detecting fraudulent behavior by the entity 206.

Conditioned upon this verification and/or updating, corresponding to the "yes" branch from the block 404, subsequent actions comprise generating a response that is to be returned to the requesting consumer. One or more portions of the response may be generated based on the private signing information associated with the certificate 220 in the certificate store 218.

More specifically, an action 406 comprises generating a signature based on the private signing information associated with the certificate 220 in the certificate store 218. The load balancer 214 and/or the SSL module 216 provided by the infrastructure service 202 may perform this action on behalf of the client entity 206 or application 212, without direct involvement by the client entity 206 or application 212. Specifically, this action may be performed without making the entity's private key directly available to the entity 206. The private key may be used on the entity's behalf, but the entity is not able to obtain the private key.

An action 408 comprises generating response data, which may include application data and security-related data. For example, this may comprise passing the request, or a portion of the request, to the application 212 to generate response data.

An action 410 comprises returning the response data from the application, the certificate 220, and any signatures generated in the action 406.

The consumer 208 receives the data, certificate, and signatures, and in an action 412 verifies the certificate and the signatures. Specifically, the certificate is traced to a trusted CA, and the signatures are verified using the public key specified by the certificate.

Note that because the private key is not accessible to the entity 206, the certificate 220 can only be used with the participation and cooperation of the infrastructure service 202 at the action 406. If at any time it becomes necessary to withdraw or disable the certificate, this can be effectively accomplished by simply refusing to perform the action 406. Furthermore, certificate usage can be monitored, and certificate usage fees can be based on actual usage.

Note also that the interactions between the consumer 208 and the application 212 have been simplified in FIG. 4 for purposes of discussion. In practice, the transaction illustrated by FIG. 4 may involve multiple requests and responses in order to establish security and subsequently transfer requested data.

Figure 5:
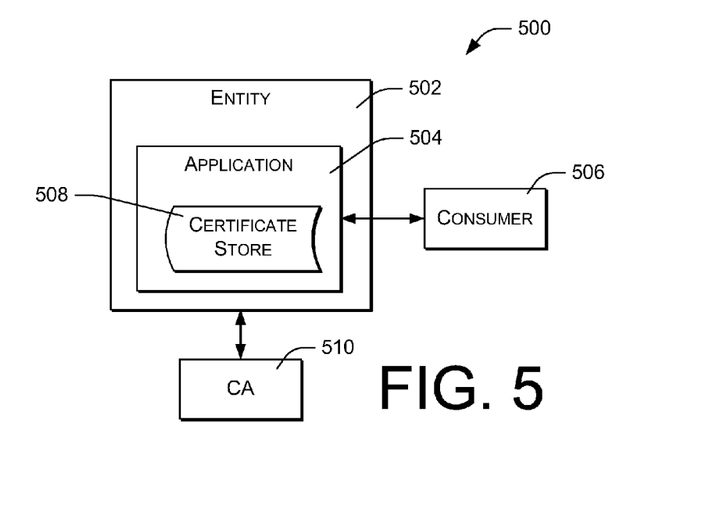
FIG. 5 is a block diagram illustrating a second example environment in which certificates may be issued to and used by applications.
Figure 6:
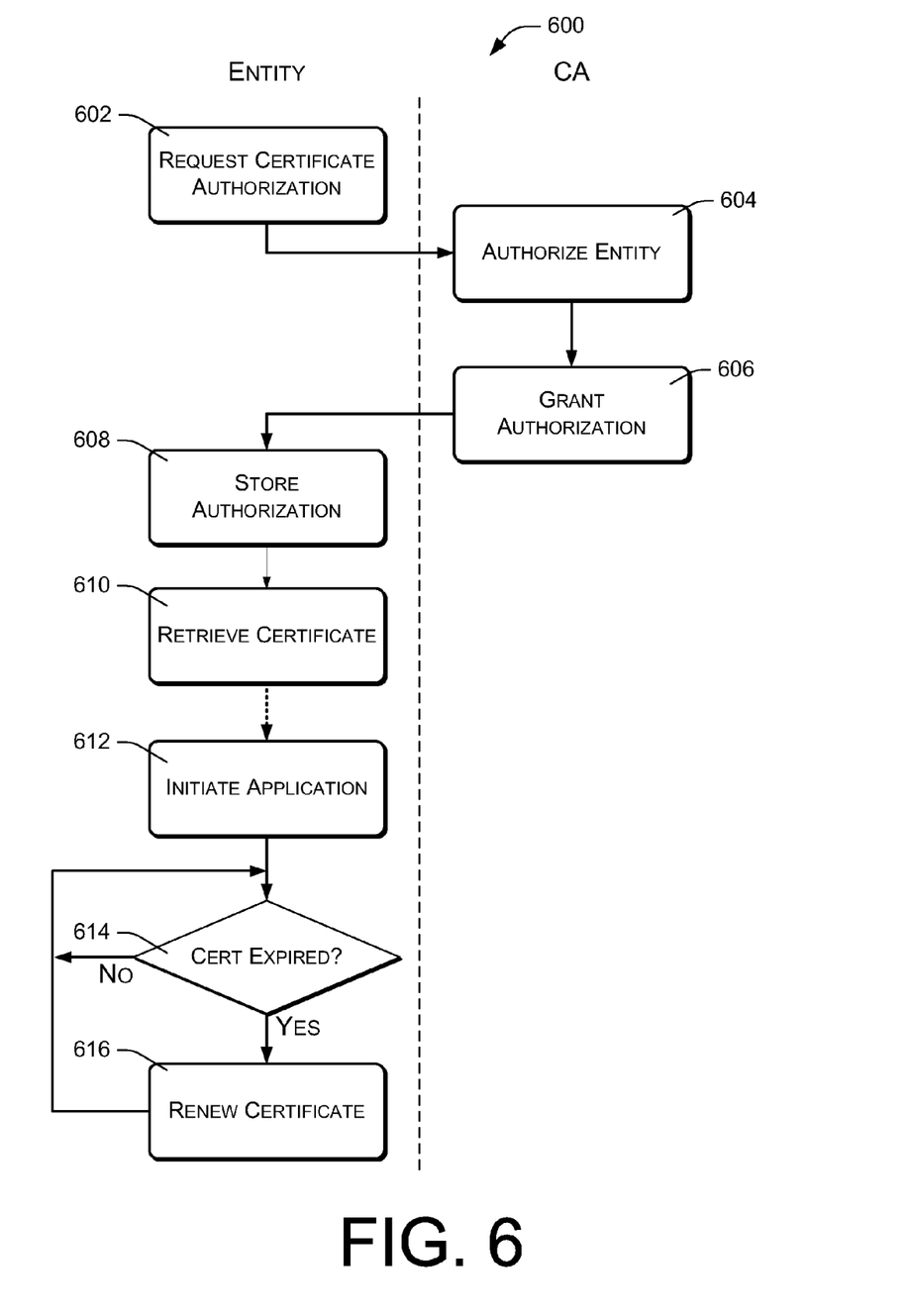
FIGS. 6 through 8 are flow diagrams illustrating example methods that may be used in the environment of FIG. 5 to issue and use identity certificates.
Figure 7:
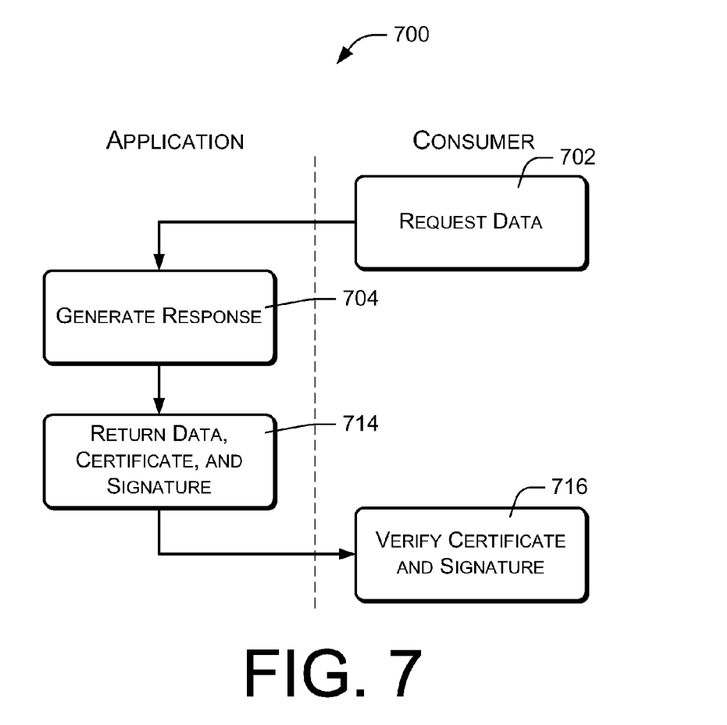
Figure 8:
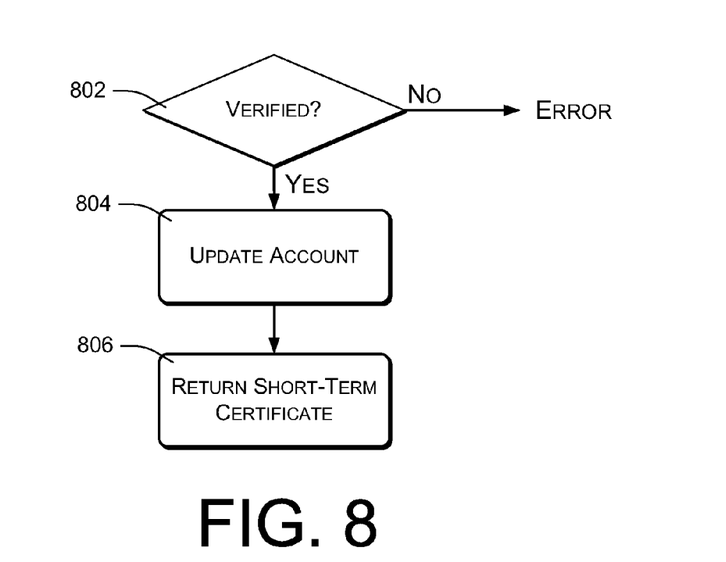

FIG. 5 shows an alternative environment 500 in which the described techniques may be implemented. FIGS. 6, 7, and 8 illustrate actions that may be performed in the environment 500 to implement the described techniques.

In the environment 500, a developer or other entity 502 creates an application 504, which may be a web service or some other type of network service that provides data to a requesting consumer 506. The consumer 506 may be a web browser or other recipient entity, and communications may be through a local-area network or a wide-area network such as the Internet. The application 504 may execute on a dedicated server system operated by the developer, on a virtual infrastructure platform or IaaS, or on any other type of infrastructure.

In this embodiment, the application 504 maintains a local certificate store 508. One or more certificates can be obtained from a CA 510 and stored in the certificate store, using the processes described below with reference to FIGS. 6, 7, and 8.

FIG. 6 shows an example of how the entity 502 and CA 510 may interact to obtain one or more certificates and to use them in conjunction with the application 504. Actions on the left are performed by the entity 502 or application 504. Actions on the right are performed by the CA 510. Note that the functions attributed to the CA 510 may be performed by other entities such as IaaS platforms, or by other entities in cooperation with the CA 510.

An action 602, performed by the entity 502, comprises requesting a certificate authorization from the CA 510. The entity 502 may provide signing information as part of the request, such as the public portion of an asymmetric key pair that includes both a public key and a corresponding private key. The authorization request may also include information about the developer entity such as names, identifications, and so forth. The authorization request may in some cases comprises a certificate signing request or CSR, similar to CSR's used in conjunction with SSL protocols.

An action 604, performed by the CA 510, comprises verifying the authorization of the entity 502 to receive the requested certificate. This may involve an investigation by the CA or may involve submission of some type of proof of the requesting entity's claims. This process may be similar to verification processes that are conventionally implemented prior to granting certificates, although perhaps less extensive because of the ability to easily withdraw or disable certificate usage.

If the authorization of the requesting entity is verified, an action 606 is performed, comprising granting and returning authorization for the entity to obtain one or more certificates. The authorization may be for a specified time period, such as a number of weeks, months, or years. In certain embodiments, the authorization may be for a relatively long period, referred to below as a first time period, such as a number of years.

After receiving the authorization, which may be in the form of a code, coupon, or identifier, an action 608, performed by the entity 502, comprises storing the authorization for later use. Note that the authorization does not itself comprise a certificate.

Upon successfully receiving the authorization, the entity may perform an action 610 of retrieving an actual certificate. This may involve submitting a request, based on the granted authorization, in a process that will be described in more detail with regard to FIG. 8.

The retrieved certificate may comprise a relatively short-term certificate. Thus, the certificate may specify an expiration corresponding to a very short certificate duration, such as a number of seconds, minutes, or hours, which is referred to below as a second time period. More specifically, the expiration specified by the certificate may specify a period of certificate validity that is significantly shorter than the period for which the certificate authorization is granted, so that multiple short-term certificates may be granted during the period of authorization.

An action 612, potentially performed at a different time by the entity, comprises initiating the application 504, which may use the granted certificate when generating responses as described with reference to FIG. 7.

After initiating the application 504, the entity 502 may perform further actions to ensure that a valid and non-expired certificate is available to the application 504. At 614, the entity 502 determines whether the existing certificate has expired. If not, as indicated by the "No" branch from block 614, this action 614 is repeated periodically.

If the existing certificate has expired or is near its expiration, as indicated by the "Yes" branch from block 614, an action 616 is performed of renewing the certificate or obtaining a new short-term certificate, in accordance with the process of FIG. 8. After obtaining a new certificate, the action 614 is iterated so that additional certificates are obtained whenever the current certificate expires.

Note that the process of keeping an up-to-date certificate can be performed in different ways. For example, the expiration of a certificate may first be detected when the application attempts to use the certificate, and such detection may trigger a process of obtaining a new certificate from the CA based on the previous authorization.

FIG. 7 illustrates an example interaction 700 between the requesting consumer 506 and the application 504 in the environment of FIG. 5. Actions performed by the application 504 are shown on the left, and actions performed by the consumer 506 are shown on the right.

An action 702, performed by the consumer 506, comprises requesting data from the application 504. This action may comprise transmitting an HTTP (hyper-text transfer protocol) request to the application 504 in response to a user clicking on an Internet link. Other types of communications protocols and mechanisms may also be used.

Upon receiving the data request, the application 504 generates a response, which may include application data and security-related data. The response may include security information, such as signatures, generated using the private signing information associated with the currently available and non-expired certificate that has been previously obtained through the processes of FIG. 6 and/or FIG. 8. An action 714 comprises returning the application data, the current certificate, and the security information, such as signatures, to the requesting consumer. The requesting consumer then performs an action 716 of verifying the certificate and any signatures created in conjunction with the certificate.

The process illustrated by FIG. 7 may in many embodiments be performed in multiple communications between the application 504 and the consumer 506, rather than the single request/response cycle shown.

FIG. 8 illustrates the process that is performed by the CA 510 in response to a request by the entity 502 for a new or renewed certificate. An action 802 comprises verifying whether the requesting entity 502 or application 504 continues to be authorized. This action may be performed by referencing an authorization previously granted to the entity 502. The action 802 may also involve determining or checking whether any events have occurred to invalidate the previously granted authorization, such as detection of security lapses or payment account delinquencies. If the verification 802 is not successful, as indicated by the "No" branch from block 802, an error is returned and the requested new certificate is not issued. If the verification 802 is successful, as indicated by the "Yes" branch from block 802, an action 804 is performed.

The action 804 comprises updating a payment account associated with the entity 502. This may include posting an additional certificate usage fee to the entity, or verifying that the entity has authorized further charges. It may include debiting the entity's account to reflect continued or additional issuances of certificates. As mentioned above, certificate usage fees may be based on actual usage. In this example, usage fees may be based on the number of short-term certificates issued.

Conditioned upon the verification and/or updating of the actions 802 and 804, an action 806 comprises returning a short-term certificate to the application 504. The certificate may specify an expiration corresponding to a very short certificate duration, such as a number of seconds, minutes, or hours, which is referred to below as a second time period. More specifically, the expiration specified by the certificate specifies a period of certificate validity that is significantly smaller than the period for which the certificate authorization is granted, so that multiple short-term certificates may be granted during the period of authorization.

The techniques described above with reference to FIGS. 6-8 allow certificates to be issued with very short expirations. Conditioned upon continuing payment or payment authorization by the entity, new short-term certificates can be issued very frequently to replace those that have expired.

Communications between the application 504 and the CA 510, in particular any communications related to requesting and returning short-term certificates, may be automated and performed using network communications. Such communications can be performed quickly and efficiently, so that they impose only an insignificant delay as the application 504 formulates its response to the requesting consumer 506.

Figure 9:
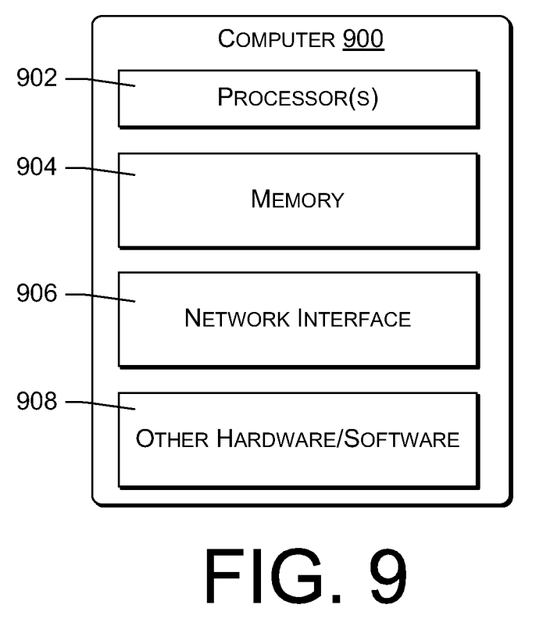
FIG. 9 is a block diagram showing high-level components of an example computer that may be configured and programmed to implement portions of the functionality described herein.

FIG. 9 illustrates relevant components of an example computer configuration that may be used to implement aspects of the functionality described above, including functionality attributed above to the client entity, developer, application, consumer, infrastructure service, and so forth. Generally, a server, service, client, browser, etc. may be implemented by one or more computers such as this, with the various functionality described above distributed in various ways. In the case of a web service such as an infrastructure service, server computers such as this may be located together or separately, and organized as virtual servers, server banks, and/or server farms. The described functionality may be provided by the servers of a single entity or enterprise, or may utilize the servers and/or services of multiple entities or enterprises.

In a very basic configuration, an example computer 900 might comprise a processing unit 902 composed one of one or more processors, and memory 904. The memory 904 may comprise computer storage media and may include volatile and nonvolatile memory. Thus, the memory 904 may include, but is not limited to, RAM, ROM, EEPROM, flash memory, or other memory technology, or any other medium which can be used to store media items or applications and data which can be accessed by the computer 900.

The memory 904 may be used to store any number of functional components that are executable on the processing unit 902, as well as data that is used by the functional component. Functionality components (not shown) may include an operating system, a web services component, application program interfaces (APIs) and various other components as may be appropriate to implement the functionality described above.

The server 900 may of course include many logical, programmatic, and physical components, of which those shown in FIG. 9 are merely examples that are related to the discussion herein. As an example, the server 900 may have a network interface 906 for communicating over the network 204. Other hardware and software components of the server 900 are represented by block 908 of FIG. 9, and may include the usual components of a network-based computer or server.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types. Although flow diagrams are used to represent certain functionality, the order of actions as depicted by the flow diagrams is not intended to be limiting, and in certain situations the depicted actions may be performed in an order that is different than illustrated.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, under control of one or more computing systems configured with executable instructions, comprising:
   executing, by the one or more computing systems, a network application on behalf of an entity;
   obtaining a certificate that associates a public cryptographic key with the entity, wherein the public cryptographic key corresponds to a private cryptographic key;
   storing the private cryptographic key and the certificate for use in conjunction with the network application, wherein the private cryptographic key is inaccessible to the entity;
   in response to requests to the network application, determining whether the entity is authorized to use the certificate; and
   in response to determining that the entity is authorized to use the certificate, generating responses on behalf of the entity using the private key and delivering the responses and the certificate on behalf of the entity.

2. The method of claim 1, wherein the determining that the entity is authorized to use the certificate comprises granting authorization for the entity to use the certificate in response to payment of at least one certificate usage fee.

3. The method of claim 1, wherein the determining that the entity is authorized to use the certificate comprises granting authorization for the entity to use the certificate in response to payment of at least one certificate usage fee, the at least one certificate usage fee being based at least in part on the number of responses generated.

4. The method of claim 1, wherein generating the responses comprises generating signatures using the private key.

5. The method of claim 1, wherein the certificate comprises a secure sockets layer (SSL) certificate.

6. A system that provides computing resources for use by entities, comprising:
   one or more processors;
   computer-readable memory storing instructions that are executable by the one or more processors to perform actions comprising:
   authorizing at least one of the entities a first time to use a certificate;
   executing applications on behalf of the said at least one of the entities to serve data to application consumers;
   in response to receiving a request from said at least one of the entities for the certificate to be served to the application consumers, authorizing said at least one of the entities a second time to use the certificate; and
   generating application responses on behalf of said one of the entities using authentication information associated with the certificate, the authentication information including at least a private portion that is inaccessible to said at least one of the entities.

7. The system of claim 6, the actions further comprising conditioning the generating upon continued authorization for said at least one of the entities to use the certificate.

8. The system of claim 6, the actions further comprising conditioning the generating upon payment of at least one certificate usage fee.

9. The system of claim 6, the actions further comprising conditioning the generating upon payment of at least one certificate usage fee, the at least one certificate usage fee being based at least in part on the number of application responses generated.

10. The system of claim 6, the actions further comprising conditioning the generating upon payment of at least one certificate usage fee, the at least one certificate usage fee being based at least in part on usage of the certificate.

11. The system of claim 6, wherein generating the application responses comprises generating at least one signature based at least in part on the private portion of the authentication information.

12. The system of claim 6, the actions further comprising obtaining the certificate from a certification authority.

13. The system of claim 6, wherein the certificate comprises a secure sockets layer (SSL) certificate.

14. A method, under control of one or more computing systems configured with executable instructions, comprising:
   receiving, by the one or more computing systems, an authorization request from a requesting entity for a certificate authorization;
   in response to receiving the authorization request, attempting to authorize the requesting entity;
   upon authorizing the requesting entity, granting the certificate authorization, wherein the certificate authorization is valid for a first time period;
   receiving multiple certificate requests from the requesting entity based at least in part on the certificate authorization; and
   in response to receiving one of the certificate requests during the first time period, providing a certificate, the certificate being valid for a second time period that is smaller than the first time period.

15. The method of claim 14, further comprising charging for each provided certificate that is based on the certificate authorization.

16. The method of claim 14, further comprising conditioning the providing of the certificate upon continued authorization of the requesting entity.

17. The method of claim 14, further comprising conditioning the providing of the certificate upon payment by the requesting entity.

18. The method of claim 14, further comprising conditioning the providing of the certificate upon payment of at least one certificate usage fee, the at least one certificate usage fee being based at least in part on certificate usage.

19. The method of claim 14, wherein the certificate comprises a secure sockets layer (SSL) certificate.

20. A method, under control of one or more computing systems configured with executable instructions, comprising:
   receiving, by the one or more computing systems, an authorization request from a requesting entity for a certificate authorization;
   in response to receiving the authorization request, attempting to authorize the requesting entity;
   upon authorizing the requesting entity a first time, granting the certificate authorization;
   issuing one or more certificates to the entity based at least in part on the certificate authorization; and
   conditioning use of the one or more certificates upon authorizing the requesting entity again a subsequent time, after the certificate authorization is granted and after the one or more certificates are issued.

21. The method of claim 20, wherein the one or more certificates have validity periods that are smaller than a period of the certificate authorization for the entity, and wherein the validity periods begin during the certificate authorization period for the entity.

22. The method of claim 20, wherein:

the one or more certificates have validity periods that are smaller than an authorization period of the certificate authorization; and the conditioning comprises performing the issuing upon the continued payment authorization by the requesting entity.

23. The method of claim 20, wherein:

the one or more certificates have validity periods that are smaller than an authorization period of the certificate authorization; and the conditioning comprises refusing to authorize the requesting entity again upon failure to receive at least one certificate usage fee.

24. The method of claim 20, wherein the one or more certificates are associated with private signing information that is inaccessible to the requesting entity, and the method further comprises generating responses on behalf of the requesting entity based at least in part on the private signing information.

25. The method of claim 20, wherein:

the one or more certificates are associated with private signing information that is inaccessible to the requesting entity; and the conditioning comprises generating responses on behalf of the requesting entity based at least in part on the private signing information, the generating being conditioned on the continued payment of at least one certificate usage fee.

26. The method of claim 20, further comprising charging the requesting entity based at least in part on the number of times the one or more certificates are used.

27. The method of claim 20, further comprising charging the requesting entity based at least in part on actual usage of the one or more certificates.

* * * * *